(12) United States Patent
Akkapeddi et al.

(10) Patent No.: US 11,777,870 B1
(45) Date of Patent: Oct. 3, 2023

(54) MACHINE-LEARNING (ML)-BASED SYSTEMS AND METHODS FOR MAXIMIZING RESOURCE UTILIZATION

(71) Applicant: Bank of America Corporation, Charlotte, NC (US)

(72) Inventors: Naga Vamsi Krishna Akkapeddi, Charlotte, NC (US); Maharaj Mukherjee, Poughkeepsie, NY (US); George Albero, Charlotte, NC (US); William August Stahlhut, The Colony, TX (US); Manu Kurian, Dallas, TX (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/860,149

(22) Filed: Jul. 8, 2022

(51) Int. Cl.
| | |
|---|---|
| G06N 20/00 | (2019.01) |
| G06F 16/27 | (2019.01) |
| H04L 29/06 | (2006.01) |
| H04L 47/783 | (2022.01) |
| H04L 47/762 | (2022.01) |
| H04L 47/70 | (2022.01) |

(52) U.S. Cl.
CPC ......... *H04L 47/783* (2013.01); *H04L 47/762* (2013.01); *H04L 47/823* (2013.01)

(58) Field of Classification Search
None
See application file for complete search history.

(56) References Cited

U.S. PATENT DOCUMENTS

| | | | |
|---|---|---|---|
| 11,327,806 B1 * | 5/2022 | Nagaraja | G06F 9/5077 |
| 2017/0039599 A1 * | 2/2017 | Tunnell | G06Q 30/0241 |
| 2021/0014113 A1 * | 1/2021 | Guim Bernat | H04L 41/042 |
| 2021/0110310 A1 * | 4/2021 | Guim Bernat | H04L 9/50 |
| 2021/0126826 A1 * | 4/2021 | Nolan | H04L 9/0825 |
| 2021/0409478 A1 * | 12/2021 | Choi | H04L 67/5682 |
| 2022/0261661 A1 * | 8/2022 | Khaligh | G06Q 10/0631 |
| 2022/0394498 A1 * | 12/2022 | Hatamian | H04W 4/021 |

* cited by examiner

*Primary Examiner* — Christopher B Robinson
(74) *Attorney, Agent, or Firm* — Weiss & Arons LLP

(57) ABSTRACT

Systems and methods for maximizing resource utilization in a digital communication system are provided. A method may include receiving a direction for a first one of a plurality of edge devices to execute a task, wherein the edge devices communicate with each other and with a central server via a communication network. The central server may be operated by an entity that is independent of the communication network. The plurality of edge devices may each include an authenticated software application that is provided by the entity. The method may also include calculating, via the ML engine for each of the plurality of edge devices, a predicted resource availability score, and distributing, via the central server, the task among the plurality of edge devices based on the predicted resource availability scores.

20 Claims, 5 Drawing Sheets

MACHINE-LEARNING (ML)-BASED SYSTEMS AND METHODS FOR MAXIMIZING RESOURCE UTILIZATION

FIELD OF TECHNOLOGY

Aspects of the disclosure relate to digital systems. Specifically, aspects of the disclosure relate to machine-learning (ML)-based systems and methods for maximizing resource utilization in a digital system.

BACKGROUND OF THE DISCLOSURE

Individual computing devices are commonly directed to perform computing tasks. Often, a device will have insufficient resources to execute the computing task. Typically, in these scenarios, execution of the task is delayed or cancelled. Delaying or cancelling a computing task can have detrimental consequences.

It would be desirable, therefore, to provide systems and methods for maximizing resource utilization in a digital system.

SUMMARY OF THE DISCLOSURE

Aspects of the disclosure relate to relate to a machine-learning (ML)-based digital communication system with maximized resource utilization. The system may include a central server. The central server may include a processor and a non-transitory memory storing computer executable instructions that, when run on the processor, are configured to cause the processor to transmit communications over a communication network. The system may also include a machine-learning (ML) engine.

The system may include a plurality of edge devices. The plurality of edge devices may be located at a logical edge of the communication network. The plurality of edge devices may be configured to communicate with each other and with the central server via the communication network.

The central server may be operated by an entity that is independent of the communication network. The plurality of edge devices may each include an authenticated software application that may be provided by the entity.

When a first one of the plurality of edge devices is directed to execute a task, the ML engine may calculate, for each of the plurality of edge devices, a predicted resource availability score. The central server may distribute the task among the plurality of edge devices based on the predicted resource availability scores.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
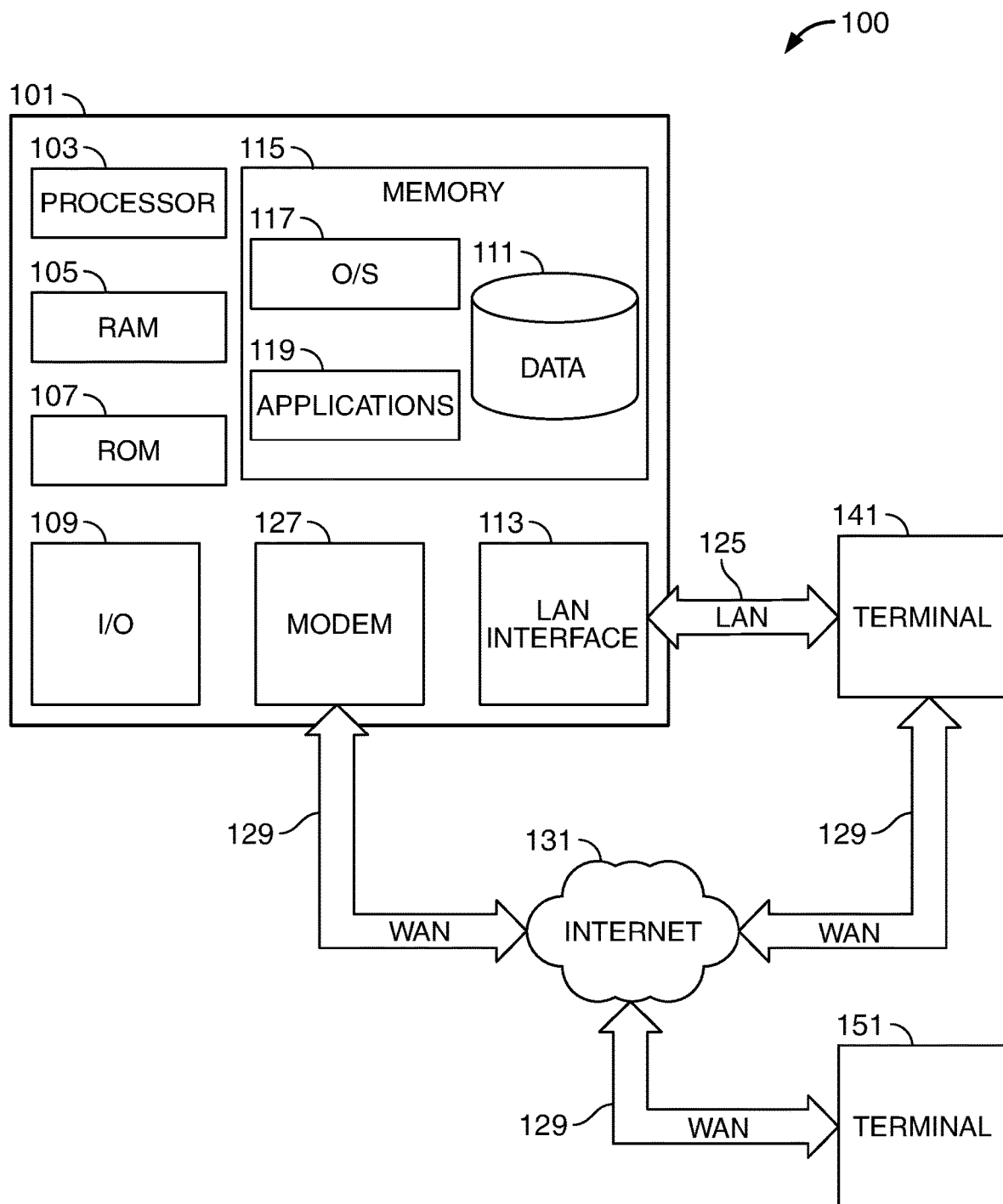
FIG. 1 shows an illustrative system in accordance with principles of the disclosure.

Systems and methods for resource balancing and maximization are provided. Aspects of the disclosure relate to a machine-learning (ML)-based digital communication system. Methods according to the disclosure may, in certain embodiments, be performed completely or in part by the system. The system may include a central server. The central server may include a processor and a non-transitory memory storing computer executable instructions that, when run on the processor, are configured to cause the processor to transmit communications over a communication network. The central server may be cloud-based. The system may also include a machine-learning (ML) engine.

The central server may be operated by an entity that is independent of the communication network. For example, the communication network may be a cellular network. The communication network may be an internet network. The internet network may include wired and/or wireless (e.g., Wi-Fi) components. The entity may be an institution. The entity may be a corporation. The entity may, for example, be a financial institution with a large network of employees and customers that operate devices that communicate over the communication network.

The system may include edge devices. An edge device may be a computing device that may be located at a logical edge of the communication network. A device at the logical edge of a network may be a device that is not part of a communication pipeline of the communication network to conduct transmissions from the central server to other network devices—rather, the edge device will typically be an endpoint on a network map. The edge devices may be configured to communicate with each other and/or with the central server via the communication network.

The edge devices may each include an authenticated software application (an "app") that may be provided by the entity. The edge devices in the system may thereby achieve a level of trust with each other that exceeds the level of trust with ordinary devices that are connected via the communication network. For example, in the illustrative scenario where the entity is a financial institution, each edge device may include an app that is associated with the institution. The app may be a dedicated app in which a user can perform operations (e.g., access to accounts, information, and transactions) relating to the user's association with the institution. The app may also include a level of security that is enforced across all edge devices. The level of security may include encryption and/or an authentication protocol. The level of security may, for example, include password protection and/or tokening. The level of security may thereby contribute to the elevated level of trust achieved between the edge devices in the system.

The edge devices may be directed to perform a task. The task may be a computing task. The task may be requested by the central server. The task may, in some scenarios, be requested by a user of the edge device. The user may request the task via the software app.

When a first one of the edge devices is directed to execute a task, the ML engine may calculate, for each of the edge devices, a predicted resource availability score. The predicted resource availability score for a device may represent a calculated prediction of the ease with which the device may be able to execute the task. For example, the score may be a number between 0 and 1, representing an increasing scale of ability to execute the task. A threshold number, for example 0.5, may represent a passing score (i.e., that the task can be successfully executed). Increased efficiency factors may cause the score to increase. For example, the predicted ability of the device to execute the task with increased speed while utilizing less resources (e.g., bandwidth, processing power, battery power, etc.) may result in a higher score than a device that is predicted to execute the task in more time while utilizing more, or a higher percentage, of available resources. The predicted resource availability score may also take into account future tasks that are scheduled to be performed on a device. For example, when a future task is scheduled on a given device for the time period during which the current task is supposed to be performed, that may be a factor that reduces the score for the given device.

The task may be distributed among the edge devices based on the predicted resource availability scores. For example, the task may be reassigned from the original edge device to the one of the other edge devices that achieved the highest the predicted resource availability score. The task may also be split and distributed to multiple edge devices. The multiple edge devices may include the device to which the task was originally assigned. The reassignment and distribution may be performed by the central server. In some embodiments, the reassignment and/or distribution may be performed by one or more edge devices. For example, the device to which the task was originally assigned may itself reassign the task and may transmit to another device the request to perform the task.

In some embodiments, the task may include storing sensitive information. The central server may segment the sensitive information into a plurality of non-sensitive segments and may store the non-sensitive segments separately on the edge devices. Distribution of tasks in general, and in particular tasks that include sensitive information, may be plausible in part due to the elevated level of trust achieved among the edge devices in the system, which may have been achieved, at least in part, due to the level of security enforced by the entity app on each of the edge devices.

In certain embodiments, the task may utilize processing power, battery power, memory, and/or connectivity. Connectivity may include quality and/or quantity of connectivity to the communication network. For example, higher connectivity may include a stronger connection and/or broader bandwidth with which a device is able to communicate via the communication network.

The first edge device may have insufficient processing power, battery power, memory, and connectivity to execute the task. The ML engine may calculate that one or more of the edge devices have sufficient processing power, battery power, memory, and connectivity to execute the task. The central server may distribute the task to the one or more of the edge devices.

In some embodiments, the ML engine may use a plurality of factors in calculating the predicted resource availability score. The factors may include inherent resources of each edge device, such as processing power, battery power, memory, and connectivity. The factors may also include historical resource usage data for each edge device. The factors may also include data specific to the task, which may include time and resources necessary for the task and/or historical data relating to resource usage for this or similar tasks.

In certain embodiments, the plurality of edge devices may include a first set of computing devices and/or a second set of computing devices. The first set of computing devices may be owned and operated by the entity. The first set of devices may include computing devices and servers installed at a physical location of the entity, automated teller machines (ATMs), and point of sale (POS) terminals.

The second set of computing devices may be owned and operated by individuals. The second set of computing devices may include primary devices including desktops, laptops, smart phones, smart watches, and tablets on which the authenticated software application is downloaded and running. The second set of computing devices may also include secondary devices including internet-of-things (IoT) devices that are controlled by the primary devices. In some embodiments, the second set of computing devices may need to receive an opt-in from the individuals to allow the central server to distribute tasks.

In certain embodiments, each of the edge devices may be secured and encrypted.

In some embodiments, when the first edge device has insufficient connectivity over the communication network and the central server has a transmission to transmit to the first edge device, the central server may transmit the transmission to a second one of the edge devices that has sufficient connectivity. The second edge device may thereafter retransmit the transmission to the first edge device via a communication channel that is independent of the communication network. The communication channel may for example, be Bluetooth, LoRa WAN, a local area network (LAN), Visible Light Communication (VLC), Li-Fi, and/or any other suitable communication channel that may be independent of the communication network.

In certain embodiments, the transmission may be a software update. The software update may, for example, be a patch or other suitable update that the central server may be attempting to transmit to some or all of the edge devices.

In some embodiments, the task may be a first task and one or more of the edge devices may be assigned one or more other tasks. The central server may be configured to redistribute the other tasks to free up resources for the first task.

Certain embodiments of the system may also include identifying data that is not frequently used and moving it to secondary storage (e.g., using a least used first out protocol). The secondary storage may include the memory of an edge device aside that is different than the device that was initially assigned the task.

In some embodiments, if the secondary storage is in a remote location, the data may be split up in multiple small fragments and distributed to the local nodes along with the address of the destination node creating a relay to the final destination. Multiple copies of the same data fragments may be distributed to several different edge nodes to ensure that if one of the node fails complete data can still be recreated through other nodes sending the same data fragment. This could also improve speed of transfer since each node is transmitting only a portion of data and some nodes might be able to transmit the data faster. Therefore, the destination node may receive data fragments from the most efficient nodes first and use that to recreate the data, and the rest of the duplicate data fragments arriving later may be discarded.

In certain embodiments, data may be distributed across two or more edge nodes. Each node may maintain a partial copy of the data and a pointer to the remaining data set. The relevant chunk of data can be retrieved from each node and combined during processing at run time without bringing all of the data together in a single node.

In some embodiments, the system may allocate a small portion of compute and storage resources of some or all entity devices for edge-to-edge communication. This may create a massive network of edge nodes with potentially unlimited compute and storage resources (e.g., ATM, Phones, Laptops, Routers, Smart TVs, etc.) that can transfer data fragments from system to system until it reaches its final destination. The allocated storage in each device may be encrypted so that it cannot be accessed by any user to enhance security and avoid a potential data breach.

In certain embodiments, instead of processing data in central servers, the system may use each node in the compute and storage grid to perform independent data processing and/or validation on their data fragment and relay the results back to the sender node either directly or through edge-to-edge communication.

In some embodiments, the system may programmatically identify underutilized high performance edge nodes (e.g., an ATM at night) to be a primary node and low power devices as data relay nodes to improve the speed and efficiency of the edge network. This may, for example, ensure that a laptop with 20% battery is not used to compute intensive data processing and can instead be used to relay the data. The heavy data processing may instead be done by primary nodes. Roles may be reversed during other times. For example, a plugged-in laptop during lunch break may be used as a primary node and an ATM during peak usage may be used as a relay node.

In certain embodiments, the system may include decentralized authentication using edge nodes. The system may create a security framework on each node and tokenize authentication. The security framework may allow a user to be authorized from any of the nodes to initiate a transaction. For example, when a transaction is authorized by one of the nodes the access may be tokenized and transmitted from node to node along with the data. The tokens may be checked by each node in the network to validate that the transaction was authenticated by previous nodes before processing the transaction and relaying it to the new node.

The framework may, in certain embodiments, have multiple types of tiers of security. The tiers may be based on the type of transaction involved and may be used to relay or mask specific type of information requested by the edge node depending on their level of security clearance. For example—a public facing edge node may not be part of a confidential data transmission, so all confidential information may be stripped by the sending node before transmission.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transmissions and executions of tasks in a digital communication network. The input/output module may also include one or more speakers for providing audio output and a video display device for providing textual, audio, audiovisual, and/or graphical output. The input and output may be related to computer application functionality. The input and output may be related to transmissions and executions of tasks in a digital communication network.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to transmissions and executions of tasks in a digital communication network.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
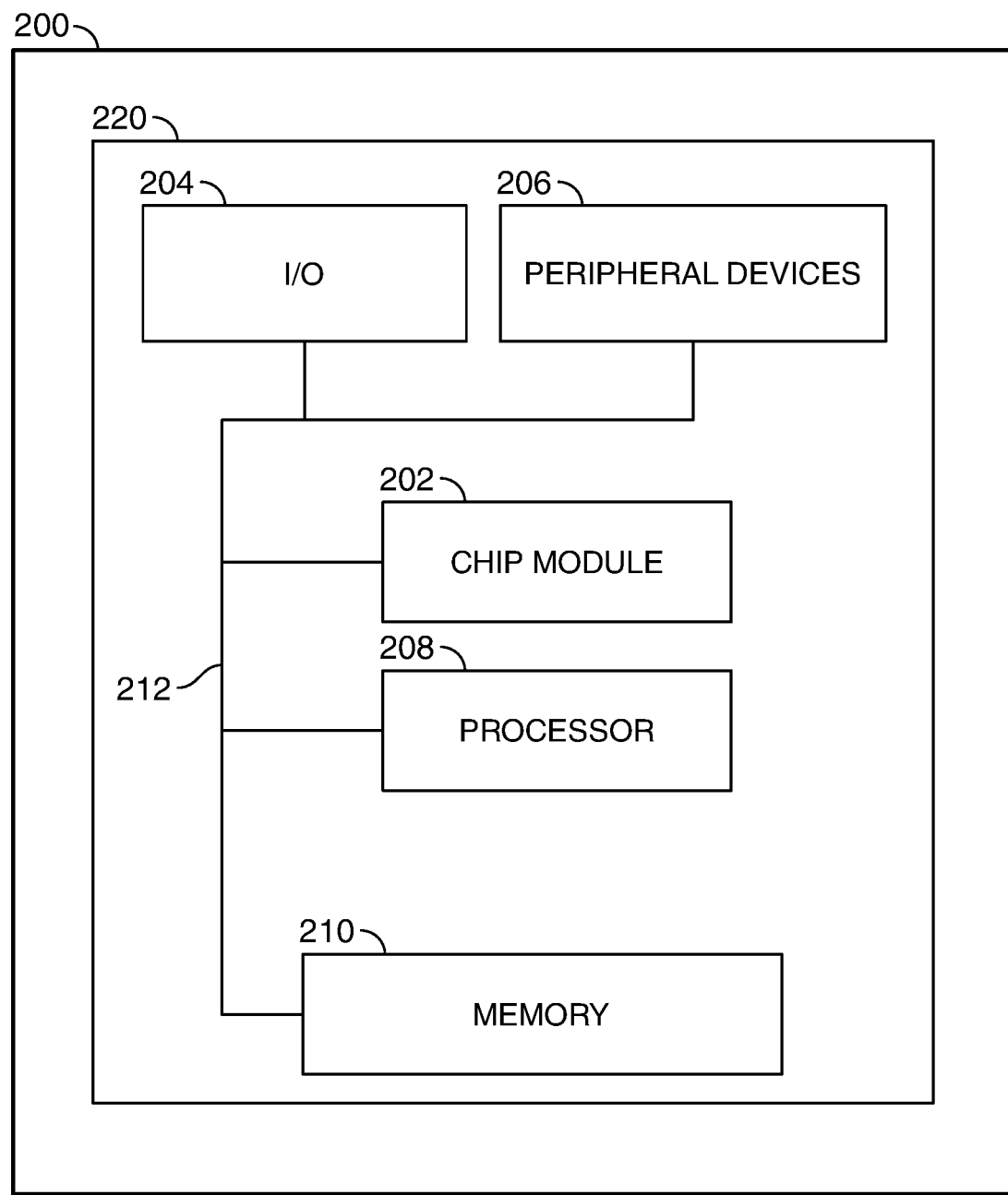
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
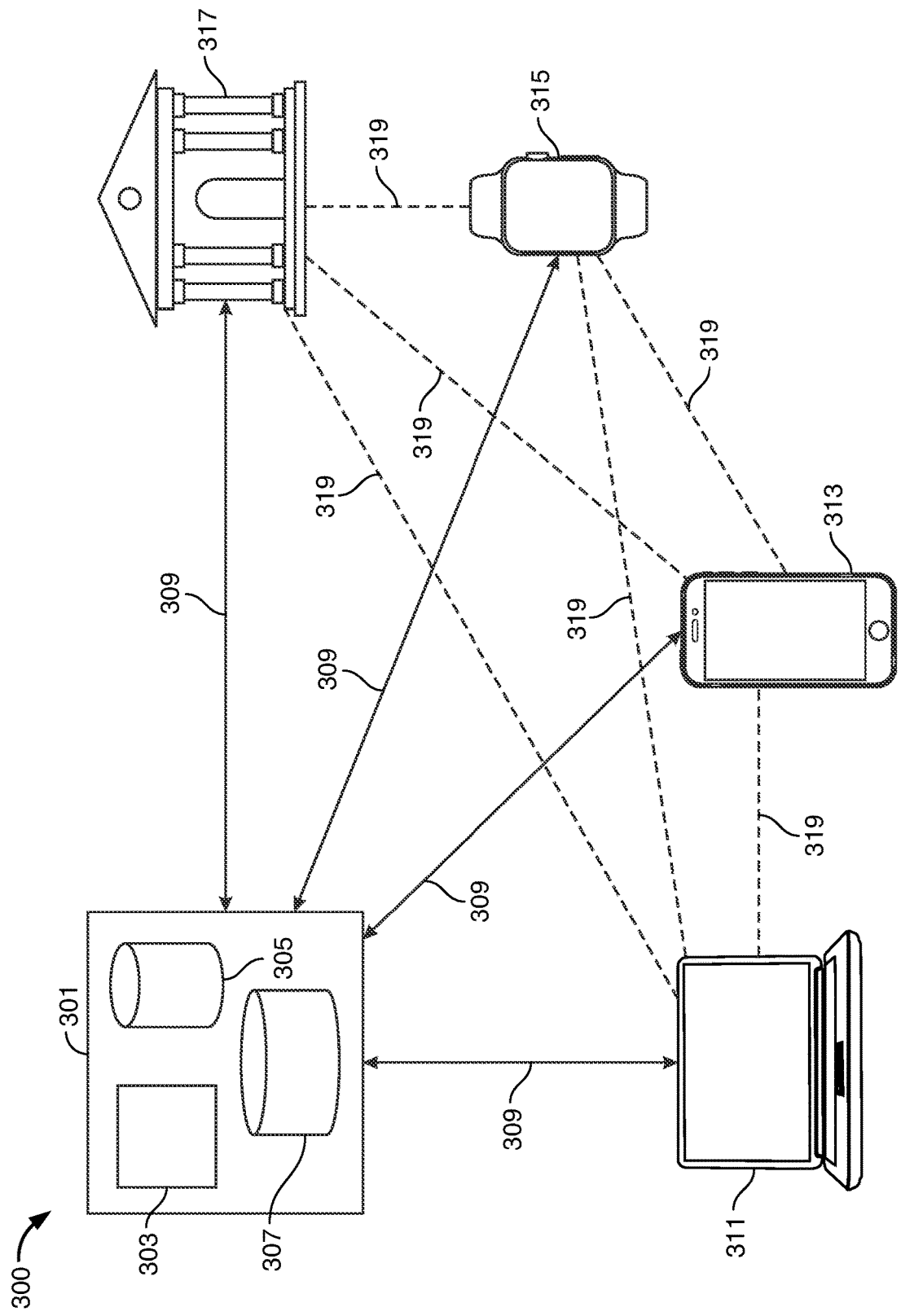
FIG. 3 shows an illustrative diagram in accordance with principles of the disclosure.

FIG. 3 shows diagram 300 in accordance with aspects of the disclosure. Diagram 300 shows a system architecture that may include central server 301. Central server 301 may include processor 303, memory 305, and ML engine 307. The system may also include edge devices 311-319, which may, for example, include a laptop, a smartphone, a smartwatch, and branch infrastructure, respectively. Edge devices 311-319 may be configured to communicate with central server 301 via primary communication network 309. When one of the devices, e.g., edge device 311, is directed to execute a computing task, the task may be redistributed to some or all of the edge devices based on predicted resource availability scores calculated by ML engine 307. Redistributing the task may include rerouting a transmission, over secondary communication channel 319, when a device to which the transmission is intended is unable to receive the transmission via primary network 309.

Figure 4:
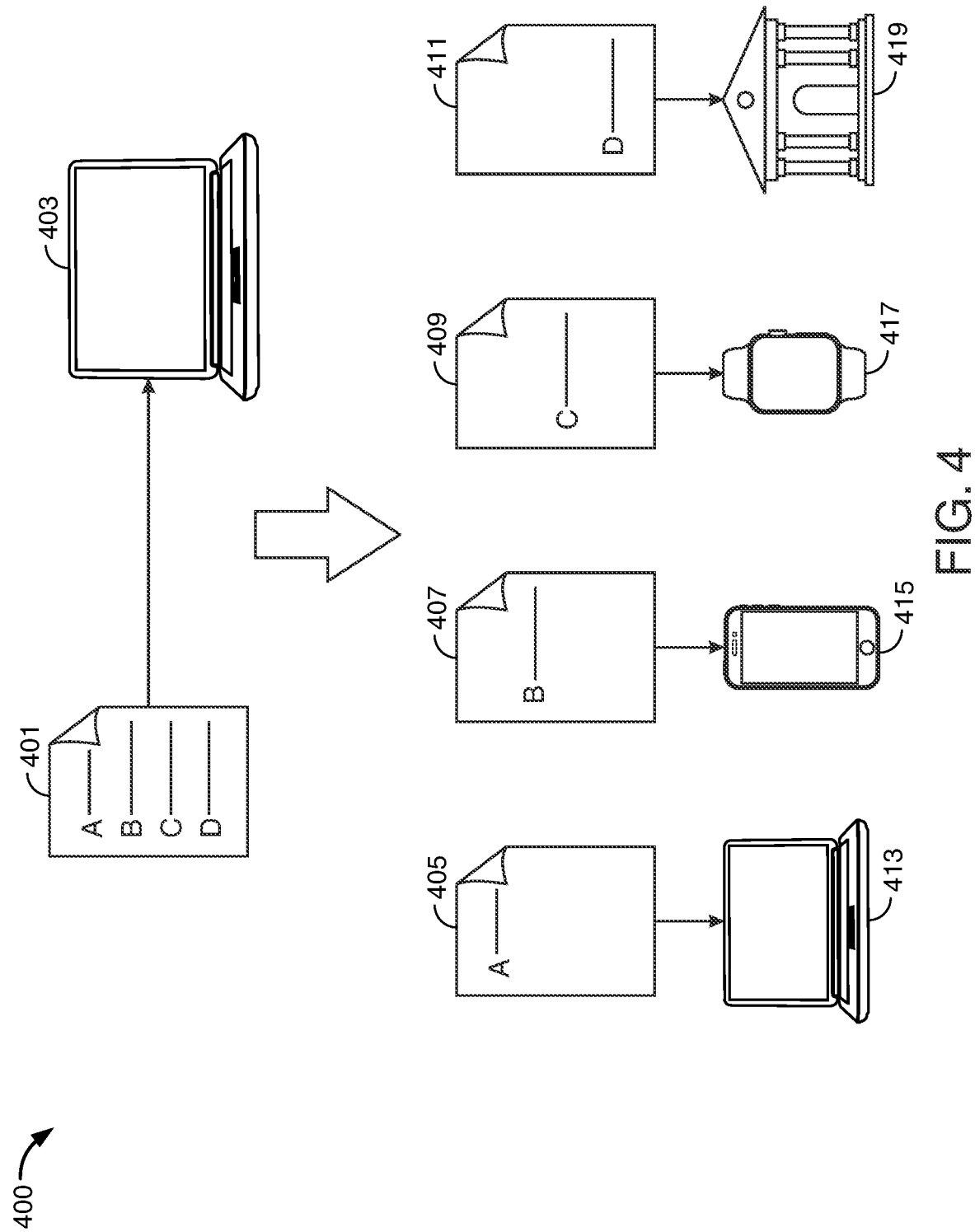
FIG. 4 shows another illustrative diagram in accordance with principles of the disclosure.

FIG. 4 shows diagram 400 in accordance with aspects of the disclosure. Diagram 4 shows one example of redistribution of a computing task. Device 403 may be directed to perform a task that may include storing sensitive data 401. Sensitive data 401 may include multiple portions, A-D. Sensitive data 403 may be vulnerable if stored in its entirety on device 403. The system may therefore segment sensitive data 403 into segments 405-411, each off which may include one portion of sensitive data 403. Each of segments 406-411 may be stored separately on edge devices 413-419. Device 413 may, in some embodiments, be original device 403. Devices 413-419 may correspond to devices 311-317 shown in FIG. 3.

Figure 5:
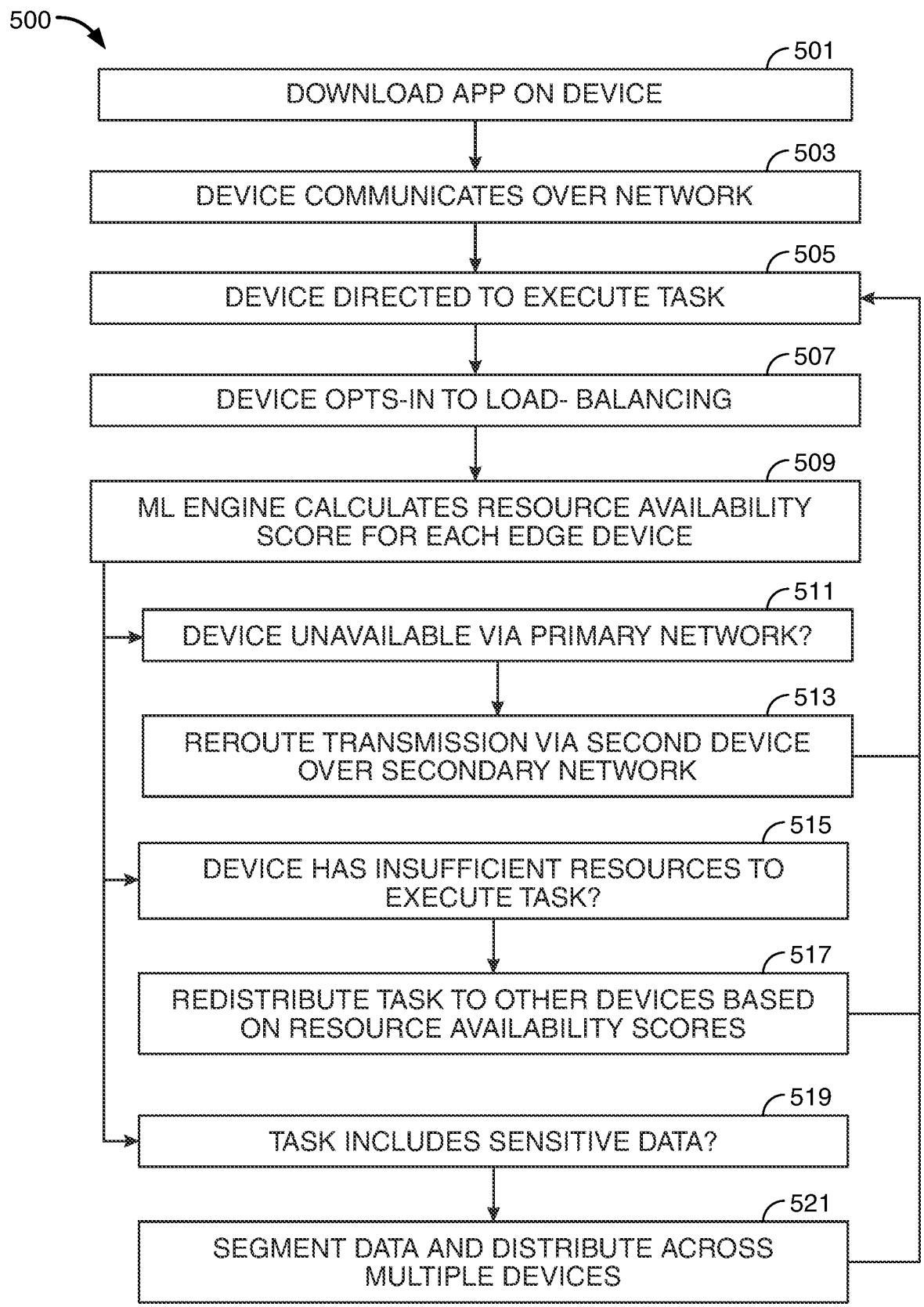
FIG. 5 shows an illustrative flowchart in accordance with principles of the disclosure.

FIG. 5 shows flowchart 500 in accordance with aspects of the disclosure. Step 501 of flowchart 500 includes downloading an app associated with an entity on an edge device. Step 503 includes the device communicating with a central server over a primary communication network. Step 505 includes the device being directed to execute a computing task. Step 507 includes the device receiving an opt-in to participate in load balancing. Step 509 includes a ML engine calculating recourse availability scores for each edge device in the system. At step 511, if the edge device is unavailable via the primary communication network, the system may, at step 513, reroute a transmission via a second edge device over a secondary communication network. At step 515, if the edge device has insufficient resources to execute the task, the system may, at step 517, redistribute the task to other edge devices. The redistribution may be based on the resource availability scores. The redistribution may be performed over the secondary communication network. At step 519, if the task includes storage of sensitive data, the system may, at step 521, segment the sensitive data and distribute the segmented data to other edge devices.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for maximizing resource utilization in digital communications systems are provided. Persons skilled in the art will appreciate that the present invention can be practiced by other than the described embodiments, which are presented for purposes of illustration rather than of limitation, and that the present invention is limited only by the claims that follow.

What is claimed is:

1. A machine-learning (ML)-based digital communication system with maximized resource utilization, the system comprising:
    a central server comprising a processor and a non-transitory memory storing computer executable instructions that, when run on the processor, are configured to cause the processor to transmit communications over a communication network;
    a plurality of edge devices, wherein the plurality of edge devices are located at a logical edge of the communication network and communicate with each other and with the central server via the communication network; and
    a machine-learning (ML) engine; wherein:
    the central server is operated by an entity that is independent of the communication network;
    the plurality of edge devices each comprise an authenticated software application that is provided by the entity; and
    when a first one of the plurality of edge devices is directed to execute a task:
        the ML engine calculates, for each of the plurality of edge devices, a predicted resource availability score, wherein the predicted resource availability score is reduced based on a future task scheduled to be performed on a device; and
        the central server distributes the task among the plurality of edge devices based on the predicted resource availability score.

2. The system of claim 1 wherein the task comprises storing sensitive information, and the central server segments the sensitive information into a plurality of non-sensitive segments and stores the non-sensitive segments separately on the plurality of edge devices.

3. The system of claim 1 wherein:
    the task utilizes processing power, battery power, memory, and connectivity; and
    when the first edge device has insufficient processing power, battery power, memory, and connectivity to execute the task, the central server distributes the task to one or more of the plurality of edge devices, wherein the ML engine calculates that the one or more of the plurality of edge devices have sufficient processing power, battery power, memory, and connectivity to execute the task.

4. The system of claim 1 wherein the ML engine uses a plurality of factors in calculating the predicted resource availability score, and the plurality of factors comprise:
    inherent resources of each edge device, said inherent resources comprising processing power, battery power, memory, and connectivity; and
    historical resource usage data for each edge device.

5. The system of claim 1 wherein the plurality of edge devices comprise:
    a first set of computing devices that are owned and operated by the entity, said first set of devices comprising computing devices and servers installed at a physical location of the entity, automated teller machines (ATMs), and point of sale (POS) terminals; and
    a second set of computing devices that are owned and operated by individuals, said second set of computing devices comprising:
        primary devices comprising desktops, laptops, smart phones, smart watches, and tablets on which the authenticated software application is downloaded and running; and
        secondary devices comprising internet of things (IoT) devices that are controlled by the primary devices.

6. The system of claim 5 wherein the second set of computing devices received an opt-in from the individuals to allow the central server to distribute tasks.

7. The system of claim 1 wherein each of the plurality of edge devices is secured and encrypted.

8. The system of claim 1 wherein, when the first edge device has insufficient connectivity over the communication network and the central server has a transmission to transmit to the first edge device, the central server transmits the transmission to a second one of the edge devices that has sufficient connectivity, and the second edge device transmits the transmission to the first edge device via a communication channel that is independent of the communication network.

9. The system of claim 8 wherein the transmission is a software update.

10. The system of claim 1 wherein:
    the task is a first task and one or more of the plurality of edge devices is assigned one or more other tasks; and
    the central server is configured to redistribute the other tasks to free up resources for the first task.

11. A machine-learning (ML)-based method for maximizing resource utilization in a digital communication system, the method comprising:

receiving a direction for a first one of a plurality of edge devices to execute a task, wherein:

the plurality of edge devices are located at a logical edge of a communication network;

the plurality of edge devices communicate with each other and with a central server via the communication network;

the central server is operated by an entity that is independent of the communication network; and the plurality of edge devices each comprise an authenticated software application that is provided by the entity;

calculating, via the ML engine for each of the plurality of edge devices, a predicted resource availability score, wherein the predicted resource availability score is reduced based on a future task scheduled to be performed on a device; and distributing, via the central server, the task among the plurality of edge devices based on the predicted resource availability score.

12. The method of claim 11 wherein the task comprises storing sensitive information, and the method further comprises:

segmenting the sensitive information into a plurality of non-sensitive segments; and storing the non-sensitive segments separately on the plurality of edge devices.

13. The method of claim 11 wherein:

the task utilizes processing power, battery power, memory, and connectivity; and when the first edge device has insufficient processing power, battery power, memory, and connectivity to execute the task, the method further comprises:

determining, via the ML engine, that one or more of the plurality of edge devices have sufficient processing power, battery power, memory, and connectivity to execute the task; and distributing the task to the one or more of the plurality of edge devices.

14. The method of claim 11 wherein the ML engine uses a plurality of factors in calculating the predicted resource availability score, and the plurality of factors comprise:

inherent resources of each edge device, said inherent resources comprising processing power, battery power, memory, and connectivity; and historical resource usage data for each edge device.

15. The method of claim 11 wherein the plurality of edge devices comprise:

a first set of computing devices that are owned and operated by the entity, said first set of devices comprising computing devices and servers installed at a physical location of the entity, automated teller machines (ATMs), and point of sale (POS) terminals; and a second set of computing devices that are owned and operated by individuals, said second set of computing devices comprising:

primary devices comprising desktops, laptops, smart phones, smart watches, and tablets on which the authenticated software application is downloaded and running; and secondary devices comprising internet of things (IoT) devices that are controlled by the primary devices.

16. The method of claim 15 wherein the second set of computing devices received an opt-in from the individuals to allow the central server to distribute tasks.

17. The method of claim 11 wherein each of the plurality of edge devices is secured and encrypted.

18. The method of claim 11 wherein, when the first edge device has insufficient connectivity over the communication network and the central server has a transmission to transmit to the first edge device, the method further comprises:

transmitting the transmission from the central server to a second one of the edge devices that has sufficient connectivity; and retransmitting the transmission from the second edge device to the first edge device via a communication channel that is independent of the communication network.

19. The method of claim 18 wherein the transmission is a software update.

20. The method of claim 11 wherein:

the task is a first task and one or more of the plurality of edge devices is assigned one or more other tasks; and the central server is configured to redistribute the other tasks to free up resources for the first task.

\* \* \* \* \*